United States Patent
Liu et al.

(10) Patent No.: US 11,238,488 B2
(45) Date of Patent: Feb. 1, 2022

(54) DELAYED PROCESSING FOR OVER-DELIVERY DETERMINATION FOR CONTENT DELIVERY SYSTEM EXPERIMENTATION

(71) Applicant: Microsoft Technology Licensing, LLC, Redmond, WA (US)

(72) Inventors: Min Liu, Palo Alto, CA (US); Parvez Ahammad, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/824,643

(22) Filed: Mar. 19, 2020

(65) Prior Publication Data
US 2021/0295374 A1   Sep. 23, 2021

(51) Int. Cl.
*G06Q 30/00* (2012.01)
*G06Q 30/02* (2012.01)
*G06Q 10/06* (2012.01)

(52) U.S. Cl.
CPC ....... *G06Q 30/0244* (2013.01); *G06Q 10/067* (2013.01); *G06Q 30/0246* (2013.01); *G06Q 30/0249* (2013.01); *G06Q 30/0274* (2013.01); *G06Q 30/0275* (2013.01)

(58) Field of Classification Search
CPC .................................................. G06Q 10/067
See application file for complete search history.

(56) References Cited

U.S. PATENT DOCUMENTS

| | | | |
|---|---|---|---|
| 2011/0307337 A1* | 12/2011 | Wilson | G06Q 30/0267 705/14.64 |
| 2017/0161774 A1* | 6/2017 | Gorsline | G06Q 30/0275 |

OTHER PUBLICATIONS

Basse, et al., "Randomization and the Pernicious Effects of Limited Budgets on Auction Experiments", In Proceedings of the 19th International Conference on Artificial Intelligence and Statistics, May 2, 2016, pp. 1412-1420.

* cited by examiner

*Primary Examiner* — Alvin L Brown
(74) *Attorney, Agent, or Firm* — Schwegman Lundberg & Woessner, P.A.

(57) ABSTRACT

A delayed grouping (batch) processing of previous campaign delivery pacing decisions and corresponding outcomes (deliveries) is used to configure a new auction experiment iteration. In the new iteration, a campaign that was previously over-delivered is classified as either (a) over-delivered due to incorrect pacing or (b) over-delivered due to auction experiment design. After the delayed processing, the new auction experiment iteration is conducted with a mitigating action taken on the previously over-delivered campaign if the campaign is classified as (b) over-delivered due to auction experiment design. For example, the mitigating action can include removing the campaign from a subsequent iteration of the experiment, or the experiment can be redesigned. By doing so, the over-delivery caused by the campaign due to the auction experiment design is avoided when performing the new auction experiment iteration.

20 Claims, 6 Drawing Sheets

DELAYED PROCESSING FOR OVER-DELIVERY DETERMINATION FOR CONTENT DELIVERY SYSTEM EXPERIMENTATION

TECHNICAL FIELD

The present disclosure relates to systems and methods for delayed processing for preventing over-delivery of content delivery campaigns when conducting auction experiments in a content delivery computing system.

BACKGROUND

When an end-user requests content from a publisher computing system ("publisher system") this often generates an associated request of a campaign content delivery computing system ("content delivery system") to present a content item or content items to the end-user at the end-user's personal computing device. For example, the publisher system may implement an online professional or social network, a search engine, or other online service that publishes content to end-users over a data communications network (e.g., the Internet).

The primary content requested varies depending on the type of publisher. For example, in the case of a professional or social network, the primary content requested might be a scrollable or browsable feed presenting information items that the professional or social network system has determined might be interesting to the end-user. As another example, in the case of a search engine, the primary content requested might be a list of search results relevant to the end-user's query.

Various types of content items are presented to end-users. For example, a content item presented to the end-user might be an advertisement, a job posting, or other content selected by the content delivery system to present to the end-user. The subject matter of the content item presented may or may not be related to the subject matter of the primary content presented. However, like the primary content, the content item presented may be composed of text, animation, graphics, audio, video, or some combination thereof.

Upon receiving the associated request to present content item(s) (referred to herein as a "content request"), the content delivery system conducts a content item selection event, sometimes referred to as an "ad auction" or just an "auction." During the auction for the content request, the content delivery system may select one or more content items to present to the end-user from among content items provided by multiple content providers (e.g., advertisers, employment recruiters, employers with job openings, etc.).

The content providers bid in the auction within their respective monetary budget constraints (or just "budget") to have a content item of theirs selected for the content request and presented to the end-user. Various different auction schemes and bidding processes may be used to conduct the auction and to select a content item or content items to present to the end-user. For example, a winning content provider of an auction might be selected to provide a content item based on bid price (e.g., second highest or highest bid), a computed probability that the end-user will take an action on the content item (e.g., click on the content item), and/or a quality or relevance score computed for the content item.

To provide content items to end-users via the content delivery system, the content providers set up content delivery campaigns with the content delivery system. The content delivery system may run multiple content delivery campaigns at the same time. A content delivery campaign may include or be associated with one or more content items along with campaign eligibility criteria.

The campaign eligibility criteria determine which auctions the campaign is eligible to participate in. The campaign eligibility criteria may specify, for example, a budget, end-user targeting criteria, frequency cap rules, a start date/time, an end date/time, etc. For example, a campaign may be determined by the content delivery system to be eligible to participate in an auction for a content request associated with an end-user because attributes of the end-user meet the campaign's targeting criteria, the end-user has not previously been presented a content item from the campaign, the campaign's budget has not yet been exhausted, and other campaign eligibility criteria is met for the content request.

Auction parameters like reserve prices and throttling schemes affect the revenue of the content delivery system and consequently how well the computing and network infrastructure of content delivery system is utilized. A/B experiments may be run by the content delivery system provider to test ideas for improving outcomes for both content providers and the content delivery system provider. These A/B experiments are sometimes referred to as "auction experiments."

Auction experiments involve various different treatments. For example, treatments in auction experiments might include bid treatments and throttling treatments. A bid treatment may involve, for example, testing whether a change to bidding rules, such as a change to the reserve or "floor" price for auctions, matters when throttling rules are unchanged. A throttling treatment may, for example, aim to understand whether changing the rules for removing (throttling out) campaigns from participating in auctions matters if bidding parameters like reserve prices are unchanged.

As with a valid A/B experiment, a valid auction experiment rests on the assumption that the treatment and control experiment arms are independent (perhaps within some error bound on bias). Unfortunately, the treatment effect of auction experiments can be severely biased as a result of campaign content requests randomized into the treatment and control experiment arms consuming the same campaign budgets.

Embodiments described herein addresses this and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-known, routine, or conventional, merely by virtue of their inclusion in this section.

DETAILED DESCRIPTION

Figure 1:
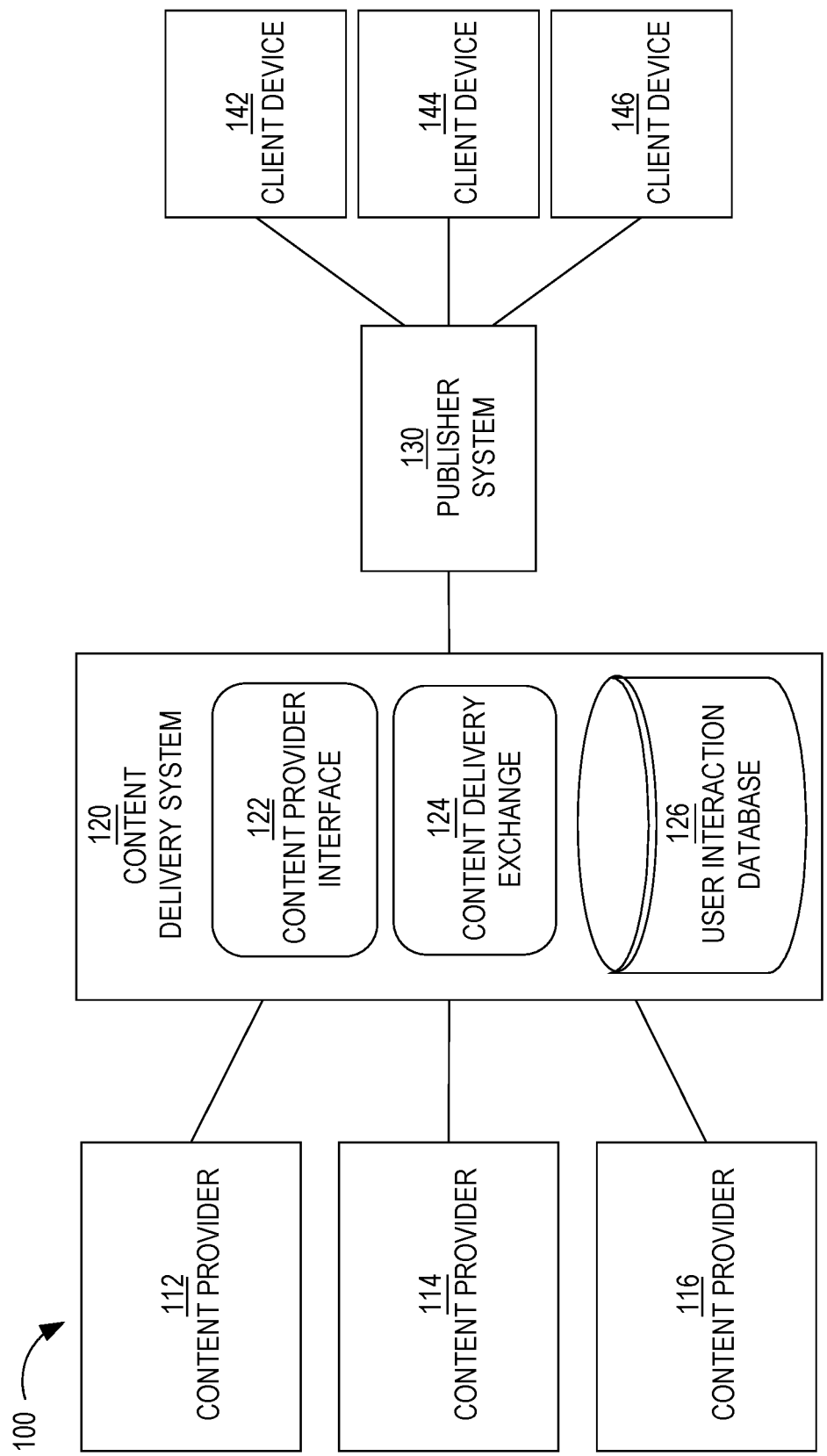
FIG. 1 depicts a content delivery system for delayed processing for over-delivery determination for content delivery system experimentation, according to some embodiments.

In the following description, for the purposes of explanation, numerous specific details are set forth in order to provide a thorough understanding of embodiments of the present invention. It will be apparent, however, that the embodiments may be practiced without these specific details. In other instances, some structures and devices are shown in block diagram form in order to avoid unnecessarily obscuring the embodiments.

Overview

Campaign content delivery computing systems ("content delivery systems") routinely conduct auction experiments to improve outcomes for content providers and operators of content delivery systems from both financial and computing and network resource utilization perspectives. Unfortunately, an improperly constructed auction experiment can be biased. For example, using a simple Bernoulli randomization of content requests over the treatment and control arms of an auction experiment can create interference bias if content requests randomized to the treatment arm consume the same budget of a campaign as the content requests randomized to the control arm. Often, the result of a biased auction experiment is a misestimation of the treatment effect. So, designing an auction experiment that circumvents bias is important.

Along with the need for circumventing bias, there is a need to prevent over-delivery. Over-delivery can occur when a campaign is allowed to participate in auctions for content requests after the campaign's budget has been exhausted or otherwise after the provider of the content delivery system can no longer charge the content provider for delivering content items from the campaign. Not only is over-delivery a revenue loss for the content delivery system provider, it is a wasteful use of the limited computing resources (processor, memory, storage, and electrical power) of the content delivery system as the computing resources used for over-delivery could have been used for revenue-generating computing.

According to some embodiments, systems and methods herein balance the need to design an auction experiment that circumvents interference bias with the need to prevent over-delivery, using a delayed grouping (batch) processing of previous campaign delivery pacing decisions (pacings) and corresponding outcomes (deliveries), a new auction experiment iteration is configured. In the iteration, a campaign that was previously over-delivered is classified as either (a) over-delivered due to incorrect pacing or (b) over-delivered due to auction experiment design. After the delayed processing, the new auction experiment iteration is conducted with a mitigating action taken on any previously over-delivered campaigns that are classified as (b) over-delivered due to auction experiment design. For example, the mitigating action can include removing the campaign from a subsequent iteration of the experiment, or the experiment can be redesigned. By doing so, the over-delivery caused by the auction experiment design is reduced or eliminated when a next auction experiment iteration is performed.

Example Technical Problem Solved

As an example of the technical problem addressed by some embodiments of the systems and methods herein, consider content delivery campaigns promoting employment opportunities (job postings) or serving advertisements to end-users of an online service (e.g., publisher system 130). A content delivery system (e.g., system 120) may run many such campaigns with varying and sometimes very small budgets. In doing so, the content delivery system may "pace" campaigns by probabilistically limiting the number of eligible content request auctions that campaigns participate in. This pacing may be performed, for example, to smooth out the consumption of the campaign's budget over a period of time (e.g., one day) such that the campaign is not substantially under-delivered and not substantially over-delivered during the delivery period. For example, the content delivery system may pace the campaign to avoid the campaign's remaining budget being entirely consumed within a short period of time such as, for example, during a one-minute period where the content delivery system receives a large burst of content request network traffic.

Continuing the example, to do this pacing, the content delivery system may maintain a "pass-through rate" for each campaign. A pass-through rate for a campaign reflects a probability that the campaign participates in a content request auction for which it is eligible. For example, if a pass-through rate for a particular campaign is ten percent (10%), the campaign content delivery system may probabilistically limit the number of content request auctions in which the campaign participates in to approximately ten percent of a number of content requests for which the campaign is eligible. Such probabilistic limiting may be accomplished in a computer system using a pseudo-random or true random number generator, for example.

In some embodiments, as part of the pacing function performed by the content delivery system, a pass-through rate for a campaign is adjusted during a delivery period (e.g., one day) during which the campaign's budget is consumed. For example, over the course of the day, the content delivery system may attempt to predict at regular delivery intervals (e.g., every minute, every five minutes, every ten minutes, etc.) the amount of a campaign's budget that will be consumed during a subsequent delivery interval and then set the pass-through rate for the subsequent delivery interval accordingly. Such predictions can be based on various different factors such as, for example, the amount of the campaign's budget that remains, the expected eligible content request traffic for the interval, an expected or predicted number of content item impressions to users during the interval, an expected or predicted click-through rate on the expected or predicted number of impressions, among other factors.

Unfortunately, the pacing performed by the content delivery system on a campaign may not be perfect, resulting in over-delivery of the campaign for a delivery period. For example, if the actual click-through rate on content item impressions during a delivery interval was much greater than the click-through rate that was expected for the interval (e.g., because the click-through rate prediction model is biased) and/or if the actual eligible content request traffic for the interval was much greater than the eligible content request traffic expected for the interval (e.g., because of a large burst in content request network traffic), then the pass-through rate for the delivery interval may have been set too high such that more (e.g., all) of the campaign's budget was consumed during the delivery interval than was expected.

As another example of the limitations of pacing, when a campaign with small remaining budget receives a large burst of content request network traffic within a short period of time (e.g. one minute), the campaign may serve significantly more impressions than is allowed by the remaining budget resulting in substantial over-delivery of the campaign. This is because campaigns are often charged by end-user clicks, which typically happen after the traffic burst window has ended and the over-delivery has occurred.

As yet another example of the limitations of pacing, because of the large amount of end-user event data processed by the content delivery system in an asynchronous manner, there may be some delay (e.g., of seconds, minutes, hours, days, etc.) in the content delivery system between consumption of a campaign's budget (e.g., because of a content item impression, click, or action) and when the pacing component is notified of that consumption. For example, a campaign's budget may be charged when an end-user clicks on a content item served to the end-user which may occur well after a large burst of content request network traffic is received by the campaign. Before notification of the end-user click, the pacing component may set a campaign's pass-through rate for a delivery interval based on an expected remaining budget that exceeds the campaign's actual remaining budget. In this case, the campaign may be over-delivered because the pass-through rate is set too high for the actual budget remaining.

Embodiments disclosed herein address these and other technical problems.

Content Delivery System

FIG. 1 is a block diagram that depicts example content delivery exchange system 100 for delayed processing for over-delivery determination for content delivery system experimentation, according to some embodiments. System 100 is an example of a content delivery exchange system in which the techniques disclosed herein for preventing campaign over-delivery during auction experiments may be implemented. System 100 includes content providers 112-116, content delivery system 120, publisher system 130, and client devices 142-146. Although three content providers are depicted, system 100 may include more or fewer content providers. Similarly, system 100 may include more than one publisher and more or fewer client devices that is depicted in FIG. 1.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, professional and social network providers, and individual bloggers. A content request from a client device may be in the form of a HTTP or HTTPS request associated with a Uniform Resource Locator (URL) and may be issued from a web browser or a software application that is configured to communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders might include one or more calls (or HTTP/HTTPS requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In some embodiments, system 100 also includes one or more bidders (not depicted). A bidder is a party that is different than a content provider, that interacts with content delivery exchange 124, and that bids for space (on one or more publisher systems, such as publisher system 430) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In some embodiments, system 100 includes one or more bidders but no content providers. However, some embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. In most content delivery systems, targeting criteria cannot be so granular as to target individual members. Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 430 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 420) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In some embodiments, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In some embodiments, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In these embodiments, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to a content item, across client devices 142-146 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a user interacted with a content item that exchange 124 delivered to a client device of the user. Examples of "user interaction" include a view or a selection, such as a "click." Content delivery system 120 stores such data as user interaction data, such as an impression data set and/or an interaction data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, an interaction data item may indicate a particular content item, a date of the user interaction, a time of the user interaction, a particular publisher or source (e.g., onsite v. offsite), a particular client device that displayed the specific content item, and/or a user identifier of a user that operates the particular client device. If impression data items are generated and processed properly, an interaction data item should be associated with an impression data item that corresponds to the interaction data item. From interaction data items and impression data items associated with a content item, content delivery system 120 may calculate an observed (or actual) user interaction rate (e.g., CTR) for the content item. Also, from interaction data items and impression data items associated with a content delivery campaign (or multiple content items from the same content delivery campaign), content delivery system 120 may calculate a user interaction rate for the content delivery campaign. Additionally, from interaction data items and impression data items associated with a content provider (or content items from different content delivery campaigns initiated by the content item), content delivery system 120 may calculate a user interaction rate for the content provider. Similarly, from interaction data items and impression data items associated with a class or segment of users (or users that satisfy certain criteria, such as users that have a particular job title), content delivery system 120 may calculate a user interaction rate for the class or segment. In fact, a user interaction rate may be calculated along a combination of one or more different user and/or content item attributes or dimensions, such as geography, job title, skills, content provider, certain keywords in content items, etc.

Auction Experiments

The content delivery system's adjustment of pass-through rates for campaigns over the course of a delivery period may not prevent all over-delivery. For this and/or other reasons, the provider of the content delivery system may wish to experiment with different bid and/or throttling treatments across some or all of the content delivery campaigns it runs. Very generally, a bid treatment affects how much a campaign bids in a content request auction and a throttling treatment affects when a campaign is called to bid in a content request auctions.

A bid treatment involves testing whether a change to bidding rules for content request auctions, such as a change to the reserve or "floor" price for auctions, matters when throttling rules are unchanged. A throttling treatment aims to understand whether changing rules for meeting budget constraints matter if bidding parameters like reserve prices are unchanged. In both cases, the auction experiment may be conducted by the content delivery system on some or all campaigns for the purpose of improving outcomes for content providers and providers of content delivery systems from both financial and computing and network resource utilization perspectives.

A bid treatment affects only potential bids for a content request auction such that a campaign that is eligible (qualifies) for the auction has the same probability of being throttled regardless of how other eligible campaigns for the content item request are assigned to treatment or control. For example, a bid treatment may experiment with a minimum bid price for auctions. A minimum bid price is sometimes referred to herein as a "reserve" price or a "floor" price. For an auction to be won, the minimum bid price for the auction must be met. If the minimum bid price is not met by at least one bid, then no content item may be selected from the campaign(s) bidding in the auctions. A minimum bid price is an example of a bid treatment that would not affect whether an eligible campaign is dropped (throttled) from a given auction so long the campaign is dropped (throttled) from the auction before the campaign's bid is made or known.

A throttling treatment affects only which campaigns eligible for a campaign content request are throttled without affecting the bids of the eligible campaigns. A throttling treatment would not affect the bid of an eligible campaign if the campaign is dropped (throttled) from the auction before the campaign's bid is made or known. For example, a throttling treatment may drop eligible campaigns from an auction based on the geographic location of the end-user associated with the content request for which the auction is being conducted or otherwise drop eligible campaigns from the auction based on a determined value to a content provider of having its campaign participate in the auction. For example, content providers of certain campaigns may not wish to participate in (e.g., advertise to) content request auctions associated with end-users outside the United States. In this example, such otherwise eligible campaigns may be throttled from auctions associated with an end-user that is not located in the United States.

A throttling treatment may be applied to a campaign before the campaign's pass-through rate is applied to the campaign. For example, for a given content request auction, the throttling treatment may be randomly applied to an eligible campaign. Thus, of all campaigns eligible to participate in the auction according their respective eligibility criteria, the throttling treatment will be applied to some of them. If application of the throttling treatment to the eligible campaign does not throttle (remove) the campaign from the auction, then the campaign's pass-through rate is applied to the campaign, which may result in the campaign being throttled (removed) from participation in the auction. The campaign's pass-through rate is also applied to eligible campaigns to which the throttling treatment is not applied.

Figure 2:
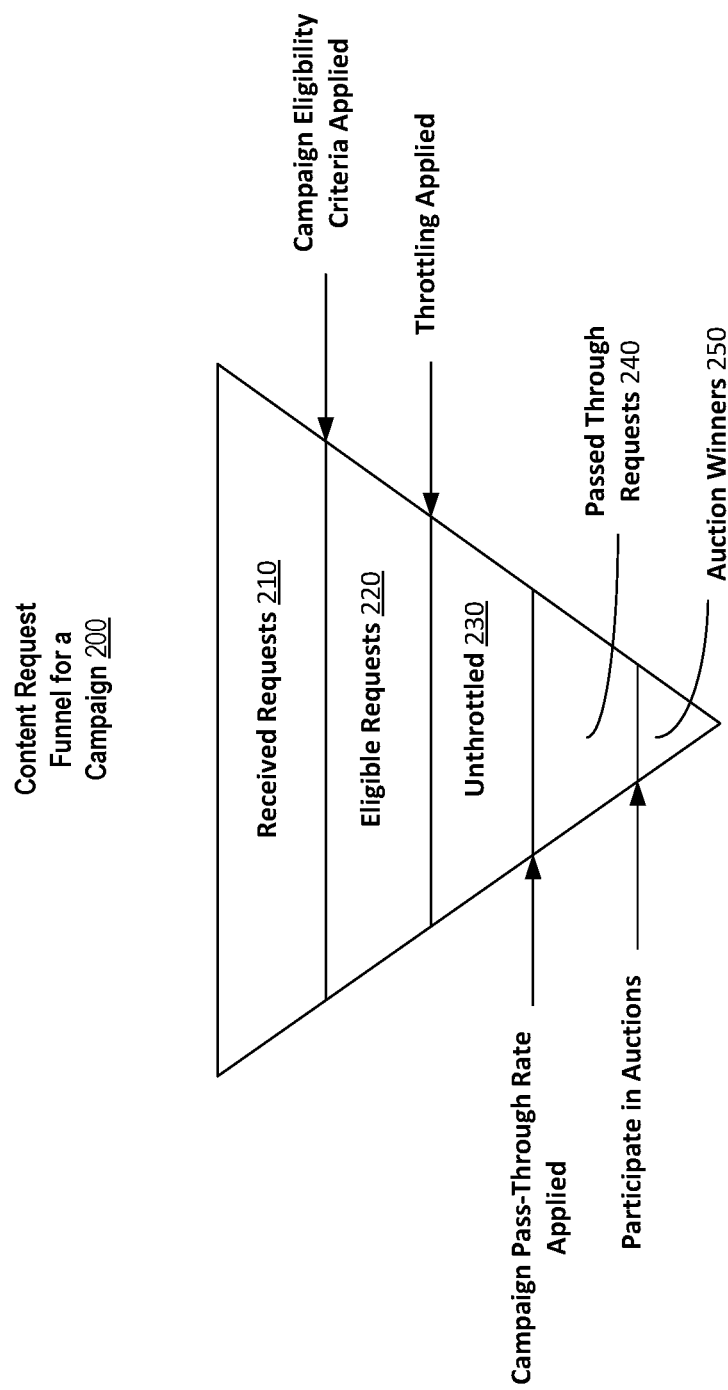
FIG. 2 illustrates a content request funnel for campaigns, according to some embodiments.

Throttling of content requests and application of the campaign pass-through rate by the content delivery system act as a funnel for content requests received by the content delivery system such that a campaign will participate in auctions for only some of all of the content requests received by the content delivery system during a period of time. FIG. 2 illustrates example funnel 200 for a given campaign, according to some embodiments. During a period of time (e.g., one day), the content delivery system receives a set of content requests (received requests 210). The campaign eligibility criteria of the given campaign are applied to received requests 210 to obtain a subset of received requests 210 for which the campaign is eligible to participate in auctions (eligible requests 220). Throttling may reduce the set of eligible requests 220 to a set of unthrottled requests 230. Application of the given campaign's pass-through rate to the set of unthrottled requests 230 may reduce the set of unthrottled requests 230 to a set of passed through requests 240 for the given campaign. The given campaign may participate in the auctions conducted for the passed through requests 240 and the given campaign may win some of those auctions. A content item is delivered (served) from the given campaign for the passed through content requests 240 for which the campaign is a winner of the auction (auction winners 250).

Variations are possible. In particular, throttling, campaign eligibility criteria, and the campaign's pass-through rate can be applied at different levels of the funnel or applied to the same set of content requests. For example, throttling can be applied to received requests 210 and then the campaign eligible criteria applied to the resulting unthrottled requests to produce a subset of eligible requests to which the campaign's pass-through rate is applied. As another example, the campaign's pass-through rate can be applied to received requests 210 resulting in a subset of passed through requests to which both throttling and the campaign's campaign eligibility criteria are applied.

In addition to, or as an alternative to, bid and throttling treatments, other types of auction experiment treatments are possible. For example, the treatment and control arms of an auction experiment may encompass different models for expected click-through rate. For example, an expected click-through rate model may compute, for a given campaign content item, a probability that an end-user served the content item will click-on or take some other predetermined action (e.g., make an online purchase). The provider of the content delivery system may wish to experiment with different expected click-through rate models to determine the one that produces the best outcomes for the content provider and the content delivery system provider.

These are just some examples of possible auction experiments and some embodiments are not limited to any particular type, class, or kind of auction experiment.

Interference Bias in Auction Experiments

Interference bias can be introduced to an auction experiment if simple Bernoulli randomization over the control and treatment arms of the experiment is used. With simple Bernoulli randomization, a "coin flip" is made to directly or indirectly assign content requests to either the control arm or the treatment arm of the auction experiment. The "coin flip" may be implemented in a computer using a pseudo-random number generator, for example. A content request may be directly assigned to treatment or control if the "coin flip" is performed for the content request. A content request may be indirectly assigned to treatment or control if the "coin flip" is performed for an end-user such that all content requests associated with that end-user are assigned to treatment or control based on the outcome of the "coin flip." Interference bias exists with simple Bernoulli randomization where content requests assigned to the treatment arm of an experiment and content requests assigned to control arm of the experiment consume the same campaign budget. The result of interference bias may be a mis-estimation of the treatment effect.

Figure 3:
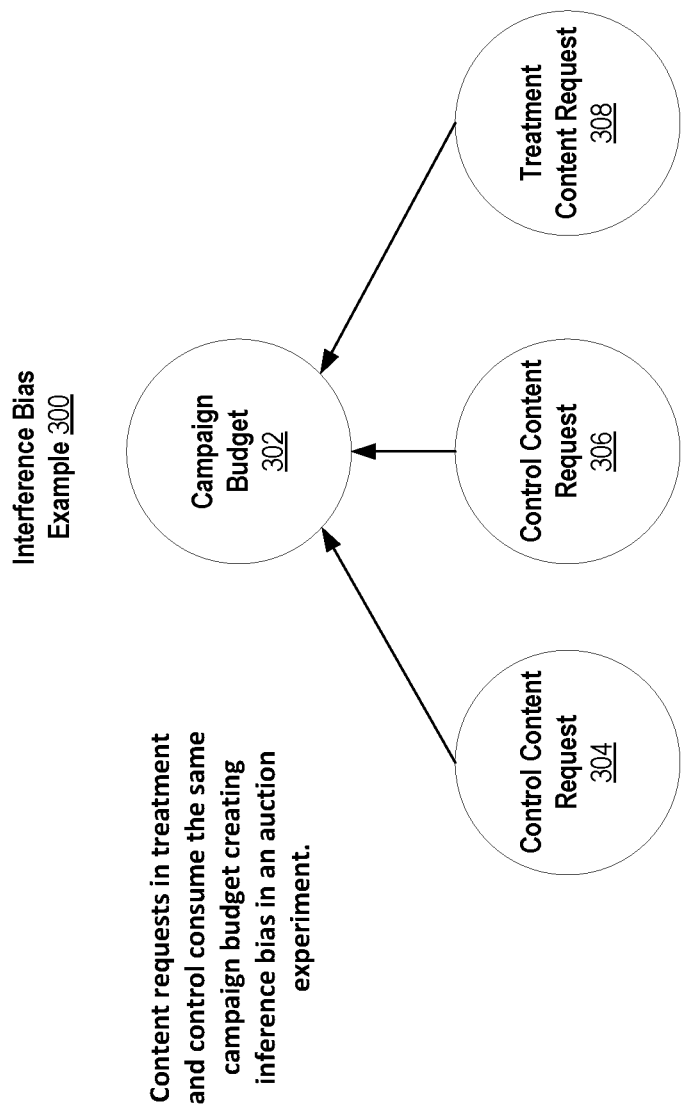
FIG. 3 depicts an example of interference bias in auction experiments, according to some embodiments.

For example, FIG. 3 depicts interference bias example 300, according to some embodiments. In example 300, there are content requests (e.g., 304, 306, and 308) of a publisher system that are served content items during an auction experiment having a control arm and a treatment arm. With simple Bernoulli randomization, each content request is randomized to the treatment or control arm with a coin flip implement by a pseudo-random number generator in a computer. Assume content requests 304 and 306 are randomly assigned to the control arm of the auction experiment. Assume content request 308 is randomly assigned to the treatment arm of the auction experiment.

Because of the simple Bernoulli randomization, content requests 304, 306, and 308 can consume the entire budget 302 of a campaign. As a result, an interference bias may be introduced to the auction experiment. For example, if the budget 302 of a campaign has been completely exhausted by content requests 306 and 308, then the treatment applied to content request 308 cannot have any revenue lift because the budget 302 was completed exhausted by content requests 306 and 308. As another example, if the treatment applied doubles the charge price for content request auctions and content request 308 consumes the entire budget 302 of a campaign, then there would be over a one hundred percent (100%) revenue lift, which is severely biased.

Eliminating or Reducing Bias in Auction Experiments

Figure 4:
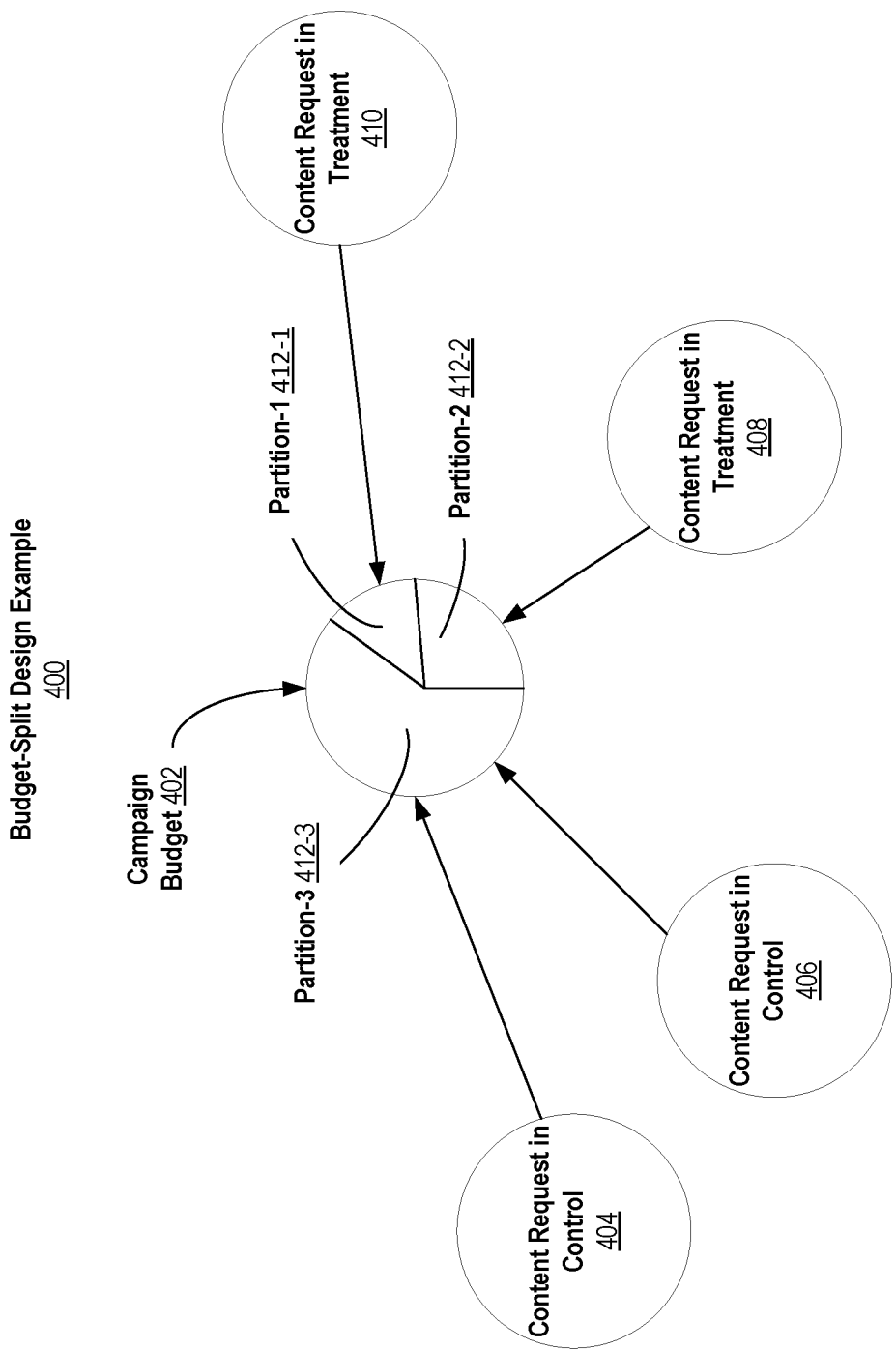
FIG. 4 depicts an example budget-split design for an auction experiment that circumvents interference bias, according to some embodiments.

In some embodiments, a budget split design is used to eliminate or reduce bias in auction experiments. FIG. 4 depicts example budget split design 400 for circumventing bias in auction experiments, according to some embodiments. In a budget split design, the campaign's budget is divided into v number of partitions and users of the online service are Bernoulli randomized into the v partitions. In example 400, there are three partitions 412-1, 412-2, and 412-3 of campaign budget 402. However, a budget split design may split a campaign budget into as few as two partitions or into more than three partitions.

According to some embodiments, the number of partitions that each campaign subject to a budget split auction experiment is divided into is determined by a parameter to an iteration of the auction experiment. For example, the number of budget partitions could be user selected. In some cases, the number of budget partitions is two: one partition for control and the other partition for treatment. However, the number of budget partitions can be three or more to accommodate variants of the treatment. In these cases, there is still one control partition but there are two or more treatment partitions, one treatment partition for each treatment variant. For example, a bid treatment may have multiple variants each corresponding to different reserve prices.

According to some embodiments, each budget partition is associated with a ramp percentage (ramp %) that determines the amount (portion) of the campaign budget assigned to the partition. The ramp percentage associated with the budget partition also controls the percentage of users Bernoulli randomized to the partition. For example, partition-1 412-1 may be associated with a 20% ramp percentage, partition-2 412-2 a 20% ramp percentage, and partition-3 312-3 a 60% ramp percentage. Other percentage allocations are possible and no particular ramp percentages are required.

According to some embodiments, the respective ramp percentages associated with the budget partitions are parameters to an iteration of the auction experiment. For example, the respective ramp percentages could be user selected.

According to some embodiments, each budget partition is allocated to either treatment or control. For example, partition-1 412-1 may be allocated to treatment, partition-2 412-2 allocated to treatment, and partition-3 412-3 allocated to control. Thus, using the example ramp percentages above, under example budget split design 400, of a set of users associated with content requests that consume all of campaign budget 402, approximately 60% of those content requests are randomized to a control partition (412-2 and 412-3) and consume approximately 60% of campaign budget 402 and approximately 40% of those content requests are randomized to the treatment partition (412-1) and consume approximately 40% of campaign budget 402.

According to some embodiments, with the budget-split design, a campaign's budget is split into partitions and content requests are randomly assigned to the partitions. The content requests assigned to a partition consume only the portion of the campaign's budget allocated to that partition and do not consume portion(s) of the campaign's budget allocated to the other partition(s). By doing this budget-split for each campaign subject to an auction experiment the possible interference between content requests assigned to the treatment arm of the auction experiment and content requests assigned to the control arm of the auction experiment is cut, thereby eliminating or reducing interference bias.

According to some embodiments, instead of a budget-split design, a content request quota-split design is used. A content request quota-split design is like a budget-split design except that each partition is allocated a percentage of the content requests allowed by the campaign's content request quota (or just "quota") as opposed to a percentage of the campaign's budget as with a budget-split design. For example, returning to the example above where partition-1 412-1 is associated with a 20% ramp percentage, partition-2 412-2 a 20% ramp percentage, and partition-3 412-3 a 60% ramp percentage and where partition-1 412-1 is allocated to treatment, partition-2 412-2 is also allocated to treatment, and partition-3 412-3 is allocated to control, under a quota-split design, of a set of users associated with a set of content requests that consume all of campaign budget 402, approximately 60% of the set of content requests are randomized to control and approximately 40% of the set of content requests are randomized to treatment.

It should be noted that reference herein to "budget" and to "quota" are interchangeable, unless the context clearly indicates otherwise. The monetary amount of a campaign's budget is equivalent to the sum of monetary amounts for each of the content requests allowed by the campaign's quota. The monetary amount for a content request can be a monetary amount charged by the provider of the content delivery system to the content provider for the content request, for example. Thus, reference herein to "budget" can be substituted with "quota," and vice versa without loss of generality, unless the context clearly indicates otherwise.

In some embodiments, the systems and methods herein for delayed processing for over-delivery determination for content delivery experimentation are applied to auction experiments that incorporate a budget-split design for circumventing interference bias. In some embodiments, the systems and methods are applied to auction experiments that incorporate a quota-split design for circumventing interference bias. While examples herein are provided in the context of auction experiments that incorporate a budget-split design, the examples are not limited to the budget-split design context and may be applied to a quota-split design in alternative implementations according to the requirements of the particular implementation at hand. Thus, reference herein to "budget-split design" can be substituted with "quota-split design," and vice versa, without loss of generality, unless the context clearly indicates otherwise.

Over-Delivery Caused by Budget-Split or Quota-Split Design

As mentioned above, because of limitations of the campaign pacing component of the content delivery system, over-delivery of a campaign can be caused by a pass-through rate that is too high for a given delivery interval such that the campaign's budget or quota is unexpectedly entirely or substantially consumed during the delivery interval. However, even where the pass-through rate is set appropriately to control for expected over-delivery, certain campaigns (e.g., campaigns with relatively low budgets or quotas) may still nonetheless be over-delivered due to the budget-split design of an auction experiment. In particular, the over-delivery of a campaign may monotonically increase as the campaign's budget or quota is further split over an increasing number of partitions.

For example, suppose a particular campaign has a total quota Q for a delivery period. Total quota Q represents the number of content requests allowed by the particular campaign's quota for the delivery period. For example, Q may be the total quota remaining for the delivery period. For example, the delivery period could be a particular day or other period of time.

Further suppose a total number R of content requests for which the particular campaign is eligible are received by the content delivery system during the delivery period. With the quota-split design of the auction experiment, if a partition of the campaign's quota is allocated r number of the total number of content requests received R, then it is also allocated r number of the particular campaign's total quota Q.

Further suppose the particular campaign's pass-through rate for the delivery period is p (e.g., 10%) Then, the expected number of content request auctions that the campaign is expected to participate in during the delivery period may be represented as pR (p multiplied by R), with a standard deviation represented as $\sigma = \sqrt{p(1-p)R}$.

Given this, according to some embodiments, an expected under-delivery D of the particular campaign for the delivery period is represented as:

$$D = Q(1+t) - (pR)$$

In the above, the parameter t represents an over charge allowance percentage for the particular campaign's quota for the delivery period. For example, to account for some uncontrollable over-delivery, the service agreement between the content provider of the particular campaign and the provider of the content delivery system may allow the provider of the content delivery system to charge the content provider up to 120% of the total quota Q. In this example, the parameter t is 0.20 (for 20%). However, t may be another value for other campaigns or implementations, such as, for example, 0 (0%), 0.05 (5%), 0.10 (10%), 0.15 (15%), etc. Thus, for the particular campaign, the expected under-delivery D for the delivery period is: (a) the total quota Q for the delivery period, (b) plus any chargeable overage for the delivery period (in number of additional requests allowed), (c) minus the number of content request auctions pR the particular campaign is expected to participate in during the delivery period, within the standard deviation.

According to some embodiments, given the above definition of under-delivery D for the delivery period, the expected over-delivery for the particular campaign for the delivery period is represented as:

$$\frac{\left\{\frac{\sigma}{\sqrt{2\pi}}\exp\left(-\frac{D^2}{2\sigma^2}\right) - D\left[1 - \Phi\left(\frac{D}{\sigma}\right)\right]\right\}}{Q(1+t)}$$

From the above formulation of the expected over-delivery for the delivery period, there are two different contributors to over-delivery of a campaign:

(1) the pass-through rate for the delivery period is too high (sometimes referred to herein as Type I Over-Delivery), or (2) the pass-through rate for the delivery period is low enough to control for expected over-delivery, but as the ramp percentage(s) of the budget-split or quota-split design decreases and the number of budget partitions increases, the distribution of the total quota Q becomes more spread out over the increasing number of partitions and over-delivery increases (sometimes referred to herein as "Type II Over-Delivery").

Type-I Over-Delivery

With Type I Over-Delivery, the pass-through rate for the delivery period was too high for the campaign. In other words, the delivery from the campaign was greater than expected.

According to some embodiments, an over-delivered campaign is detected as Type 1 Over-Delivery in a delayed processing manner when the following is true:

$$p > \frac{\alpha Q(1+t)}{R}.$$

Here, the parameter p represents a pass-through rate for the campaign for the delivery period during which the campaign was over-delivered. The parameter Q(1+t) represents the campaign's total quota Q for the delivery period plus any allowed overage (in number of additional content request allowed according to the overage percentage t). The parameter R represents a number of content requests received by the content delivery system during the delivery period for which the campaign was eligible before the pass-through rate p was applied to the campaign. Recall, the application of the pass-through rate to a campaign may result in the campaign being throttled (dropped) from a content request auction for which it is otherwise eligible. For example, if the pass-through rate p for a campaign is 10% for the delivery period, then, absent other throttling, the campaign would be expected to be throttled (dropped) from approximately 90% of the content request auctions for which it is eligible during the delivery period.

If the campaign's pass-through rate p for the delivery period is relatively high compared to the percentage of (a) the number R of content requests received by the content delivery system during the delivery period for which the campaign was eligible that are (b) within the campaign's quota Q(1+t) for the delivery period plus any allowed overage, then the campaign may have been allowed to participate in too many content request auctions such that over-delivery occurred.

The parameter a represents a tolerance that accounts for the probability that the campaign will not "win" every content request action that it participates in. That is, the content delivery system may not select a content item from the campaign to serve to an end-user for every content request auction that the campaign participates in (e.g., because the campaign did not make a winning bid). In some embodiments, the parameter a is a value greater than one (1) such as, for example, two (2). For example, the parameter a may be selected (e.g., empirically by a human or according to a computer-implemented algorithm) according to the requirements of the particular implementation at hand.

Type II Over-Delivery

According to some embodiments, an over-delivered campaign is detected as Type II Over-Delivery in a delayed processing manner when the following is true:

$$p < \frac{\alpha Q(1+t)}{R}.$$

In other words, the converse of a Type I Over-Delivery. With Type II Over-Delivery, the pass-through rate p for the campaign was low enough for the delivery period to control for over-delivery in expectation. However, because of the budget-split design of the auction experiment, as the ramp percentage(s) of the design decreases, the campaign's budget may be spread too thin over the budget partitions, causing over-delivery of the campaign as the pacing component of the content delivery system is no longer effective at controlling over-delivery in expectation through periodic adjustment of the pass-through rate for the campaign.

Figure 5:
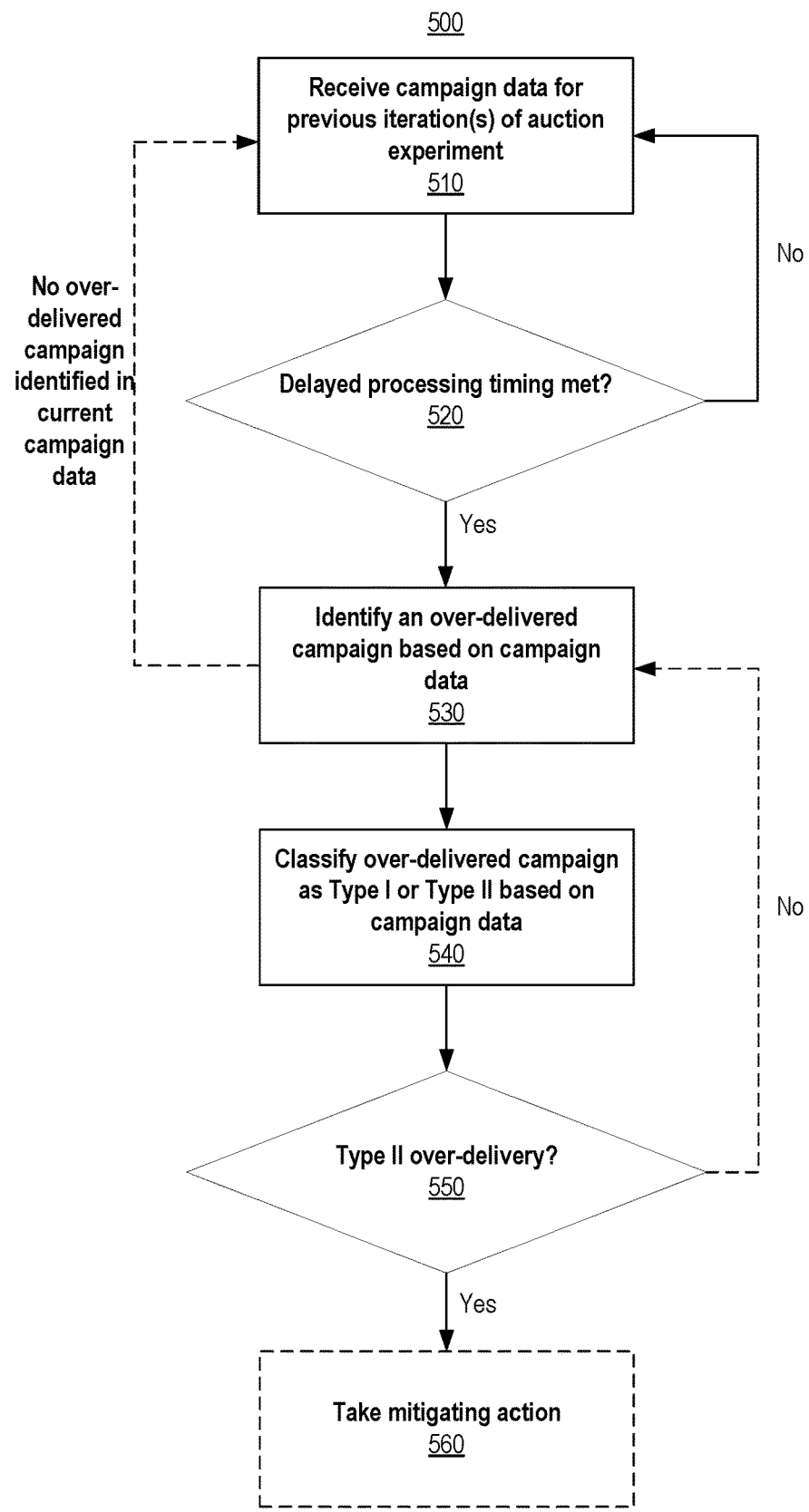
FIG. 5 is a flowchart of a method for delayed processing for over-delivery determination for content delivery system experimentation, according to some embodiments.

Example Method for Delayed Processing for Over Delivery Determination for Content Delivery System Experimentation FIG. 5 illustrates method 500 for delayed processing for over delivery determination for content delivery system experimentation, according to some embodiments. In summary, method 500 proceeds by identifying 530 an over-delivered campaign based on campaign data for the campaign received 510 during a delayed processing window. Once an over-delivered campaign is identified 530, classification 540 of the over-delivered campaign is made as either Type I Over-Delivery or Type II Over-Delivery. In some embodiments, if campaign is classified 540 as Type II Over-Delivery, then a mitigating action is taken 560 on the campaign or the auction experiment. In some embodiments, the mitigating action taken 560 is removing (withholding) a Type-II Over-Delivered campaign from a subsequent iteration of the auction experiment to prevent over-delivery of the campaign during the subsequent iteration.

As an example, consider an auction experiment with a budget-split design or a quota-split to circumvent interference bias. An iteration of the auction experiment may be conducted every day for a number of days. For example, a new iteration may start at 0:00 UTC each day. On a given day, a number of campaigns run by the content delivery system may be subject to the auction experiment. Over-delivery of certain campaigns (e.g., relatively low-budget campaigns), as discussed elsewhere herein, may be caused by the budget-split design or the quota-split design of the auction experiment.

Method 500 may be used to identify campaigns that were over-delivered during a prior iteration of the auction experiment where the cause of the over-delivery was the budget-split design or the quota-split design of the auction experiment. Mitigating action may then be taken 560 on the auction experiment or such identified campaigns before a subsequent iteration of the auction experiment, thereby eliminating or reducing over-delivery during the subsequent iteration. The system depicted in FIG. 1 (and/or the hardware in FIG. 5) may be used to implement method 500 and other embodiments herein.

As another example, a content delivery system may provide users with a computer user interface (e.g., a graphical user interface in a web browser or a mobile application) that allows the users to specify various configurable parameters of an auction experiment with a budget-split design. Such configuration parameters may include, but are not limited to, budget-split design or quota-split parameters. Budget-split design or quota-split design parameters may include, but are not limited to, the number of budget-split partitions or the number of quota-split partitions.

Before the configuration is applied to a subsequent iteration of the auction experiment, method 500 may be used to identify campaigns that were over-delivered during a prior iteration of the auction experiment where the cause of the over-delivery was a budget-split design or a quota-split design of the auction experiment. For any such identified campaigns, increasing the number of budget-split or quota-split partitions may exacerbate Type-II Over-Delivery during the subsequent iteration. In this case, mitigating action may then be taken 560 on the auction experiment warning the user that applying the configuration to the subsequent iteration of the auction experiment may induce additional over-delivery for some campaigns. For example, upon the user selecting a save or apply option in the computer user interface for the configuration, the user may be prompted in the computer user interface with the warning and asked to confirm or cancel the configuration.

In some embodiments, as a mitigating action 560 on the auction experiment, the user is prevented from saving or applying a configuration that would exacerbate Type-II Over-Delivery. For example, upon the user selecting the save or apply option, the user may be informed in the computer user interface that the configuration cannot be saved or applied.

In some embodiments, when Type-II Over-Delivery is detected for some or a threshold number of campaigns that were over-delivered during a prior iteration of the auction experiment, the mitigation action 560 on the auction experiment includes prompting a user in a computer user interface to reconfigure the budget-split design or the quota-split design of the auction experiment before a subsequent iteration of the auction experiment. For example, the user may be prompted in a computer user interface to reduce the number of budget-split or quota-split partitions of the auction experiment.

In many of the examples herein, the iterations of an auction experiment correspond to periods of time (e.g., consecutive days in local or UTC time for the auction experiment in question). In some embodiments, the iterations may correspond to different periods of time. For example, the iterations may correspond to one- or four-hour blocks in local or UTC time for the auction experiment in question. Further, iterations of an auction experiment may apply to all campaigns or a selected subset of all campaigns. For example, some campaigns that included prior iterations of an auction experiment may be omitted from subsequent iterations of the auction experiment because they are identified as Type-II Over-Delivered campaigns.

In some embodiments, an auction experiment with a budget-split or quota-split design runs for a number of iterations. For example, the auction experiment may run for a number of days. The treatment effect may be measured at the end of the auction experiment where such measurement may vary based on the type of treatment. For example, the amount of revenue lift to the operator of the content delivery system caused by the treatment may be measured.

During an auction experiment, one or more campaigns may be over-delivered during one or more iterations of the auction experiment. Further, one or more of the over-delivered campaigns may be detected (e.g., according to method 500) as Type-II over-delivery. As a result, a mitigating action 560 may be taken on the Type-II over-delivered campaigns such as, for example, removing the campaigns from subsequent iterations of the auction experiment or reconfiguring the budget-split or quota-split design of the auction experiment for the subsequent iterations.

In some embodiments, when a mitigating action 560 is taken on a campaign or the auction experiment, the auction experiment is allowed to complete the subsequent iterations and the treatment effect is measured at the end of the auction experiment as if no mitigating action(s) 560 were taken.

In other embodiments, the auction experiment is stopped before all iterations have been conducted. For example, if more than a threshold number of campaigns (e.g., more than 10% of an initial set of campaigns for the auction experiment) are detected with Type-II over-delivery, then the auction experiment may be stopped as the treatment effect may be mis-estimated as a result of the number of campaigns on which a mitigating action 560 is taken.

According to some embodiments, during an auction experiment, content requests are randomized to a budget-split or a quota-split partition according to the ramp percentages associated with the partitions. For example, referring again to FIG. 4, assume first treatment partition 412-1 is configured with a 10% ramp percentage, second treatment partition 412-2 is also configured with a 10% ramp percentage, and control partition 412-3 is configured with an 80% ramp percentage. In this case, a content request has an approximately 80% probability of being assigned to control partition 412-3, an approximately 10% probability of being assigned to first treatment partition 412-1, and an approximately 10% probability of being assigned to second treatment partition 412-3.

In other embodiments, end-users associated with content requests are randomized to a budget-split or a quota-split partitions during an auction experiment according to the ramp percentages associated with the partitions. In these embodiments, all content requests associated with a particular end-user received during the auction experiment may be assigned to the same budget-split or quota-split partition to which the particular end-user is randomly assigned.

In either case, a content request is randomized to a budget-split or quota-split partition, either directly or via the end-user associated with the content request. An initial set of campaigns that are eligible to participate in the auction for the content request may then be determined. For example, the initial set of eligible campaigns may be determined according to the campaign eligibility criteria associated with the campaigns. The initial set may be reduced by throttling. The throttling applied to the initial set may vary depending on which budget-split or quota-split partition that the content request is assigned to. If assigned to the control partition, then any control throttling may be applied to the initial set. If assigned to a treatment partition, then any throttling treatment associated with the treatment partition may be applied to the initial set. If throttling is applied to the initial set, then one or more eligible campaigns may be removed from the initial set and do not participate in the content request auction for the content request. If no throttling is applied to the initial set, then all campaigns in the initial set remain eligible to participate in the auction. Regardless whether throttling is applied to the initial set, each remaining campaign's current pass-through rate may be applied to the respective campaign to determine whether the campaign participates in the content request auction for the content request. Finally, the content request auction is conducted with the eligible campaigns from the initial set that remain after any the throttling is applied and after the pass-through rates are applied.

Returning to the top of process 500, campaign data is received 510 for previously executed iteration(s) of an auction experiment. Received data may take any appropriate form. In some embodiments, data may be received from another system, may be received by another process, function etc. within the same system, may be received in a shared memory spaces, such as a database, directory, etc. For example, a content delivery system 120 may have previously executed iteration(s) of the auction experiment, and campaign data may be received 510 indicating the outcomes of those previously executed iteration(s). The campaign data and associated campaign may be stored in attached storage, cloud storage, at storage local to content delivery system 120, or content delivery exchange 124, or in in any other appropriate location.

Associating received 510 campaign data with a particular campaign may include using an attribution for previously executed iteration(s) of the auction experiment. This can be important when it might otherwise be ambiguous which campaign was associated with the received 410 campaign data. For example, if a previous iteration of an auction experiment is applied to multiple campaigns, then it may be difficult to know which campaign to attribute any received 410 campaign data. In some embodiments, attribution is done by attributing content requests to campaigns that are eligible to participate in content request auctions for content requests. For example, if a campaign is eligible to participate in auctions for multiple content requests, then those content requests would be attributed to the campaign for purposes of associating received campaign data with the campaign.

Turning briefly to FIG. 1, which is discussed more above, note that the various systems 120 and 130 are discussed as two separate entities for simplicity. System 120 and 130 may be implemented as the same system. For example, publisher system 130 may be implemented as a system for serving primary content to client devices (e.g., 142, 144, and 146), and separately a system or service that conducts auctions in response to content requests associated with serving the primary content.

Campaign data may be received 510 in one form and stored in another form. In some embodiments, the received campaign data may be an indication of a number of content requests for which a campaign was eligible to participate in auction(s) during a period of time (e.g., a particular day, a particular minute or minutes during a particular day, or particular period of time). The stored campaign data may represent the number of content requests numerically or in any appropriate form. For example, content delivery system 120 (or any other system 124) may receive an indication that a content request was received during the period of time for which one or more campaigns were eligible. Therefore, the content delivery system 120 may store an indication of incrementing (e.g., +1) a counter tracking the number of content requests received during the period of time for an eligible campaign.

In some embodiments, campaign data may be received 510 for multiple delivery intervals during a particular delivery period for multiple campaigns. For example, campaign data may be received 510 for each minute (or every ten minutes, every hour, etc.) during a particular day. In some cases, the delivery interval may be the same as the delivery period (e.g., one day). The campaign data received 510 for a delivery interval and for a campaign may indicate the number of content requests for which the campaign was eligible during the delivery interval to participate in auctions.

In some embodiments, campaign data received 510 for a campaign includes campaign-specific information other than just the number of eligible content requests for the campaign during a delivery period or a delivery interval. In addition, campaign data received 510 for a campaign may include a pass-through rate for the campaign for a delivery period of a delivery interval. Campaign data received 510 for a campaign may include a budget or quota for a delivery period that remains at the start of the delivery period or at the start of a delivery interval within the delivery period. For example, campaign data may be received 510 for multiple campaigns where the campaign data covers a previous delivery period day or a previously delivery period minute. For each campaign, the campaign data received 510 for a campaign may indicate the pass-through rate for the campaign at the start of the previous delivery period or previously delivery interval, the remaining budget or quota at the start of the previous delivery period or previously delivery interval, and the number of content requests received or processed during the previous delivery period or the previous delivery interval for which the campaign was eligible to participate in auctions. It should be noted, as mentioned earlier, that the campaign may not participate in each auction for which it was eligible during the previous delivery period or the previous delivery interval because of the campaign's pass-through rate or for other reasons (e.g., a content request throttling scheme of the auction experiment).

In some embodiments, receiving 510 campaign data may include receiving clickthrough data. For example, using the job posting or advertisement example, if the user clicks on the job posting or advertisement, then campaign data may be logged based on that click. For example, returning to the job posting or advertisement example, if the user clicked on the advertisement, then consumption of campaign budget may be received 510 based on interpreting the click as meaning that the user was interested in the content of the advertisement or job posting.

In some embodiments, receiving 510 campaign data may be delayed and/or may be based on log data. For example, the data related to consumption of campaign budget and/or click and other types of campaign data may be stored in one or more log files and the association of campaign data with campaigns may be based on reviewing and processing that log data. Receiving 510 such campaign data is delayed since it occurs after that reviewing and processing of the log files.

If the delayed process (or batch) timing has not been met 520, then process 500 will continue to collect campaign data until the timing is met 520 (as depicted by the arrow from 520 to 510).

In some embodiments, the delayed processing timing is not met during a "batch window." The delayed processing or batch window timing may be any appropriate time period, such as one day, one hour, one minutes, etc.

In some embodiments, meeting 520 the batch timing may include the passage of a particular amount of time since the end of the previous delayed processing period, or may be met by a certain real-world time (e.g., at midnight UTC).

In some embodiments, meeting 520 the batch timing may also include receiving 510 a predetermined number of campaign data-campaign pairs. For example, in order to meet 520 the delayed processing timing, both a particular amount of time has to have passed and a certain number of content requests have to be received.

In some embodiments, meeting 520 the delayed batch timing may include receiving 410 a certain number of content requests, without a requirement for the passage of a certain amount of time Returning to the job posting or advertisement example, the campaign data for previously delivered campaigns may be received 510 until a delayed processing timing is met 520. The timing might be met 520 when a twenty-four period has elapsed. Before that timing is met 520, more campaign data for previously delivered campaigns may continue to be received 510.

If the delayed processing (or batch) timing is met 520, then process 500 will proceed by identifying 530 an over-delivered campaign based on the campaign data received 510 for the campaign during the delayed processing window. In some embodiments identifying an over-delivered campaign includes determining if the campaign's budget was entirely consumed during a delivery period or during a delivery interval. Determining if a campaign's budget was entirely consumed during a delivery period or during a delivery interval may include determining if extra (not chargeable) deliveries were made for the campaign beyond the campaign's budget or quota, including any budget or quota overage tolerance. For example, if the campaign's budget is $100 and the budget overage tolerance is 20%, then non-chargeable content item deliveries from the campaign over $120 during the delivery period or during the delivery interval are extra deliveries. As another example, if the campaign's quota is 100 content requests and the quota overage tolerance is 15%, then non-chargeable content item deliveries from the campaign over 115 content requests during the delivery period or during the delivery interval are extra deliveries. In some embodiments, the campaign data in the batch (received 510 during the delayed processing window) may be used to identify 530 over-delivered campaigns, as may campaign data from previous iteration(s) of the auction experiment.

If no over-delivered campaigns are identified 530 in the current campaign data for current batch or for the current delayed processing window, then process 500 may return to receive 510 new campaign data until a next batch or delayed processing window is ready 520.

A campaign identified 530 as over-delivered is classified 540 as either Type-I or Type-II over-delivery. According to some embodiments, classifying 540 a campaign as Type-I or Type-II over-delivery includes comparing a pass-through rate for the campaign for a delivery period or a delivery interval during which the campaign was over-delivered to a pass-through rate threshold. If the pass-through rate is greater than the pass-through rate threshold, then the campaign is classified as a Type-I Over-Delivery. If the pass-through rate is less than the pass-through rate threshold, then the campaign is classified as a Type-II Over-delivery.

According to some embodiments, the pass-through rate threshold is campaign specific and is based on the campaign's remaining quota (or budget) remaining at the start of the delivery period or the delivery interval, plus any allowed quota (or budget) overage. In addition, the pass-through rate threshold is based on the number of content requests during the delivery period or the delivery interval for which the campaign was eligible. For example, according to some embodiments, an over-delivered campaign is classified 540 as Type II Over-Delivery when the following is true:

$$p < \frac{\alpha Q(1+t)}{R}.$$

Here, the parameter p represents the pass-through rate for the campaign for the delivery period or the delivery interval during which the campaign was over-delivered. The parameter $$\frac{\alpha Q(1+t)}{R}$$

represents the pass-through rate threshold for the campaign and the for the delivery period or the delivery interval during which the campaign was over-delivered. In particular, the sub-parameter Q(1+t) represents the campaign's remaining quota (or budget) remaining at the start of the delivery period or the delivery interval, plus any allowed quota (or budget) overage and the sub-parameter R represents the number of content requests during the delivery period or the delivery interval for which the campaign was eligible. Viewed alternatively, the sub-parameter R represents the amount of content request network traffic during the delivery period or the delivery interval for which the campaign was eligible. As mentioned above, the sub-parameter a represents a tolerance that accounts the probability that the campaign will not "win" every content request action that it participates in.

If 550 an over-delivered campaign identified 530 is classified 540 as a Type-II Over-Delivery, then a mitigation action 560 may be taken on the campaign or the auction experiment as described above. Otherwise, operations 530-560 may be repeated for other over-delivered campaigns identified 530 in the current batch or delated processing window of campaign data.

Computing System Implementation

In some embodiments, a computing system (e.g., computing device 600) includes one or more processors and storage media coupled to the one or more processors. The one or more processors and the storage media of the computing system may be provided by one or more computing devices. An example computing device 600 is described below with respect to FIG. 6. The storage media stores instructions which, when executed by the computing system, cause the computing system to perform any of the above methods.

In some embodiments, one or more non-transitory media (e.g., storage media) stores instructions which, when executed by a computing system, cause the computing system to perform any of the above methods.

In some embodiments, a computing device (e.g., 600) hosts one or more hypervisors that operate on the computing device and emulate and/or virtualize computing hardware. A hypervisor can be a Type-1 (bare-metal hypervisor) or Type-2 hypervisor (hosted hypervisor), for example.

In some embodiments, a computing device employs operating system-level virtualization in addition to, or in the absence of, one or more hypervisors. With operating system-level virtualization, the operating system kernel facilitates multiple isolated user space instances sometimes referred to as containers, zones, virtual private servers, partitions, virtual environments, virtual kernels, jails, etc.

In some embodiments, multiple computing devices in a distributed computing environment performs any of the above methods. In such an environment, computing devices may be continuously, periodically, or intermittently interconnected by one or more data communications networks (e.g., one or more Internet Protocol (IP) networks.)

Example Computing Device

Figure 6:
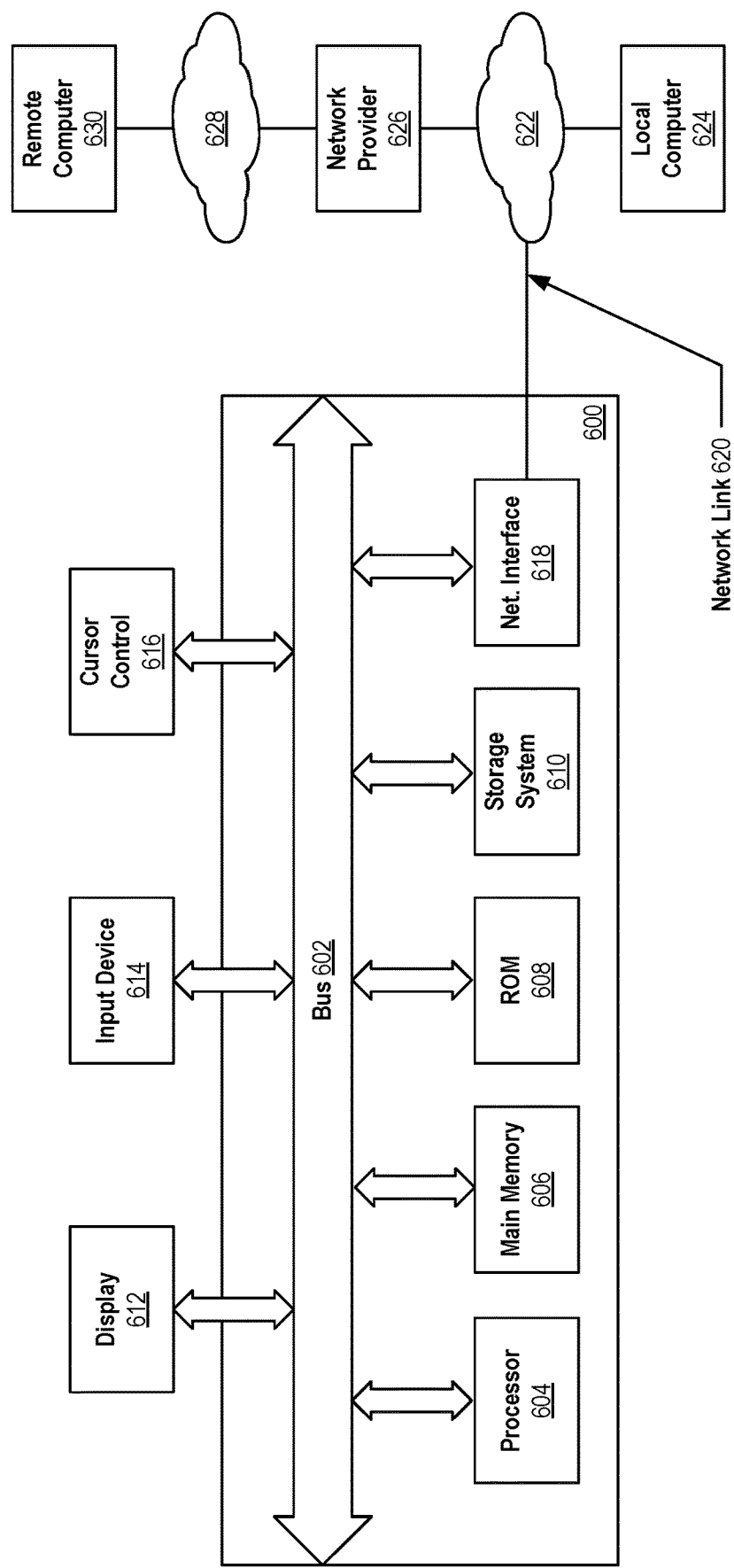
FIG. 6 illustrates an example computing device, according to some embodiments.

FIG. 6 illustrates example computing device 600 according to some embodiments. Computing device 600 includes bus 602 or other communication mechanism for communicating information, and one or more hardware processors 604 coupled with bus 602 for processing information. Computing device 600 is just one example of a possible computing device that may be used in an implementation. Other computing device configurations having more, fewer, or different components may be used in an implementation.

Hardware processor(s) 604 include, for example, one or more general-purpose microprocessors, central processing units (CPUs) or cores thereof, graphics processing units (GPUs), or systems on a chip (SoCs).

Computing device 600 also includes main memory 606, implemented by one or more volatile memory devices, coupled to bus 602 for storing information and instructions to be executed by processor(s) 604. Main memory 606 also may be used for storing temporary variables or other intermediate information during execution of instructions by processor(s) 604.

Computing device 600 includes read-only memory (ROM) 608 or other static storage device coupled to bus 602 for storing static information and instructions for processor(s) 604.

Storage system 610 implemented by one or more non-volatile memory devices is provided and coupled to bus 602 for storing information and instructions.

Computing device 600 is coupled via bus 602 to display 612, such as a liquid crystal display (LCD), a light emitting diode (LED) display, or a cathode ray tube (CRT), for displaying information to a computer user. Display 612 may be combined with a touch sensitive surface to form a touch screen display. The touch sensitive surface may be an input device for communicating information including direction information and command selections to processor(s) 604 and for controlling cursor movement on display 612 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 614, including alphanumeric and other keys, is coupled to bus 602 for communicating information and command selections to processor(s) 604. Another type of user input device is cursor control 616, such as, for example, a mouse, a trackball, or cursor direction keys, for communicating direction information and command selections to processor(s) 604 and for controlling cursor movement on display 612. For example, his input device may have two degrees of freedom in two axes, a first axis (e.g., x) and a second axis (e.g., y), that allows the device to specify positions in a plane.

In some embodiments, computing device 600 in response to processor(s) 604 executing instructions contained in main memory 606 performs any of the above methods. Such instructions are read into main memory 606 from another storage medium, such as storage system 610. Execution of the instructions contained in main memory 606 may cause processor(s) 604 to perform any of the above methods. Hard-wired circuitry may be used in place of or in combination with instructions to perform any of the above methods.

The term "storage media" as used herein refers to any non-transitory media that store data and/or instructions that cause a machine to operate in a specific fashion. Such storage media may comprise non-volatile media (e.g., storage system 610) and/or volatile media (e.g., main memory 606). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 602. Transmission media can also take the form of acoustic or light waves, such as those generated during radio-wave and infra-red data communications.

Computing device 600 also includes data communications network interface 618 coupled to bus 602. Network interface 618 may provide a two-way data communication coupling to a wired or wireless network link 620 that is connected to a local, cellular or mobile network 622. For example, network interface 618 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Network interface 618 may send and receive electrical, electromagnetic or optical signals that carry digital data streams representing various types of information.

Network link 620 provides data communication through one or more networks to other data devices. For example, network link 620 may provide a persistent, periodic, or intermittent connection through network 622 to local computing device 624 that is also connected to network 622 or to data communication equipment operated by a network access provider 626 such as, for example, an internet service provider or a cellular network provider. Network access provider 626 in turn may provide data communication connectivity to another data communications network 628 (e.g., the Internet). Networks 622 and 628 both may use electrical, electromagnetic or optical signals that carry digital data streams. The signals through the various networks and the signals on network link 620 and through network interface 618, which carry the digital data to and from computing device 600, are example forms of transmission media. Computing device 600 may send messages and receives data, including program code, through the networks 622 and 628, network link 620 and network interface 618. In the Internet example, a remote computing device 630 may transmit a requested code for an application program through network 628, network 622 and network interface 618. The received code may be executed by processor 604 as it is received, and/or stored in storage device 610, or other non-volatile storage for later execution.

CONCLUSION

For situations in which the above systems and methods collect information about users, the users may be provided with an opportunity to opt in/out of programs or features that may collect personal information (e.g., information about a user's preferences or usage of a smart device). In addition, in some instances, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, the ordering and groupings presented herein are not an exhaustive list of alternatives.

In the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description and in the appended claims, the terms "based on," "according to," "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As used in the foregoing detailed description and in the appended claims, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing detailed description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

The invention claimed is:

1. A method comprising:
receiving a set of campaign data for content item campaign deliveries made during an auction experiment having a budget-split design or a quota-split design, the set of campaign data containing content from multiple campaigns, including previous campaigns, based on a specified delivery interval where the content was eligible for delivery;
based on the set of campaign data, identifying a campaign that was over-delivered during the auction experiment;
comparing a pass-through rate for the campaign to a pass-through rate threshold for the campaign; and
based on the pass-through rate for the campaign being below the pass-through rate threshold for the campaign, removing the campaign from the auction experiment;
wherein the method is performed by one or more computing devices.

2. The method of claim 1, wherein:
the auction experiment comprises a plurality of iterations;
the set of campaign data is received for content item campaign deliveries made during a first iteration of the plurality of iterations;
the campaign is removed from a second iteration of the plurality of iterations; and
the second iteration is conducted after the first iteration.

3. The method of claim 1, further comprising:
determining a first number of content requests allowed within a budget of the campaign;
determining a second number of content requests allowed by an over-budget tolerance;
based on the set of campaign data, determining a third number of content requests for which a content item delivery was made; and
wherein the identifying the campaign that was over-delivered is based on third number of content requests exceeding a sum of the first number of content requests and the second number of content requests.

4. The method of claim 1, further comprising:
determining the pass-through rate threshold for the campaign based on both:
(a) a remaining budget or quota for the campaign, and (b) a number of content requests for which the campaign was eligible to participate in content item selection events.

5. The method of claim 1, wherein the auction experiment comprises a quota-split design.

6. The method of claim 1, wherein the auction experiment comprises a budget-split design.

7. A system comprising:
one or more processors;
storage media; and
instructions stored in the storage media and which, when executed by the one or more processors, cause the system to perform:
receiving, during a batch window, a set of campaign data for content item campaign deliveries made during an auction experiment having a budget-split design or a quota-split design, the set of campaign data containing content from multiple campaigns, including previous campaigns, based on a specified delivery interval where the content was eligible for delivery;
after the batch window, identifying one or more campaigns that were over-delivered during the auction experiment;
comparing a pass-through rate for an over-delivered campaign, of the one or more over-delivered campaigns, to a pass-through rate threshold for the over-delivered campaign; and
based on the pass-through rate for the over-delivered campaign being below the pass-through rate threshold for the over-delivered campaign, removing the over-delivered campaign from at least one iteration of the auction experiment or stopping the auction experiment.

8. The system of claim 7, further comprising:
instructions which, when executed by the one or more processors, cause the system to perform:
based on the pass-through rate for the over-delivered campaign being below the pass-through rate threshold for the over-delivered campaign, removing the over-delivered campaign from an iteration of the auction experiment.

9. The system of claim 7, wherein:
the auction experiment comprises a budget-split design;
the budget-split design has a first number of treatment partitions;
the system further comprises instructions which, when executed by the one or more processors, cause the system to perform:
based on the pass-through rate for the over-delivered campaign being below the pass-through rate threshold for the over-delivered campaign, causing a graphical user interface to be presented at a computing device where the graphical user interface includes graphical user interface controls for reducing a number of treatment partitions of the budget-split design from the first number of treatment partitions.

10. The system of claim 7, wherein:
the auction experiment comprises a quota-split design;
the quota-split design has a first number of treatment partitions;
the system further comprises instructions which, when executed by the one or more processors, cause the system to perform:
based on the pass-through rate for the over-delivered campaign being below the pass-through rate threshold for the over-delivered campaign, causing a graphical user interface to be presented at a computing device where the graphical user interface includes graphical user interface controls for reducing a number of treatment partitions of the quota-split design from the first number of treatment partitions.

11. The system of claim 7, further comprising:
based on the pass-through rate for the over-delivered campaign being below the pass-through rate threshold for the over-delivered campaign, stopping the auction experiment.

12. The system of claim 7, further comprising:
instructions which, when executed by the one or more processors, cause the system to perform:
removing the over-delivered campaign from at least one iteration of the auction experiment before a next batch window or stopping the auction experiment before a next batch window.

13. The system of claim 7, wherein:
the auction experiment comprises a budget-split design;
the budget-split design comprises a plurality of partitions; and
the plurality of partitions comprises a control partition and one or more treatment partitions.

14. The system of claim 7, wherein:
the auction experiment comprises a quota-split design;
the quota-split design comprises a plurality of partitions; and
the plurality of partitions comprises a control partition and one or more treatment partitions.

15. The system of claim 7, wherein:
the received campaign data comprises, for each campaign of a plurality of campaigns, both:
(a) a number of content requests remaining within a quota for the campaign and (b) a number of content requests received for which the campaign was eligible;
the plurality of campaigns includes the over-delivered campaign;
the system further comprises instructions which, when executed by the one or more processors, cause the system to perform computing the pass-through rate threshold for the over-delivered campaign based on both: (a) the number of content requests remaining within the quota for the over-delivered campaign and (b) the number of content requests received for which the over-delivered campaign was eligible.

16. The system of claim 7, wherein:
the received campaign data comprises, for each campaign of a plurality of campaigns, a number of content item deliveries made for the campaign;
the plurality of campaigns includes the over-delivered campaign; and
the system the system further comprises instructions which, when executed by the one or more processors, cause the system to perform the identifying the over-delivered campaign based on the number of content item deliveries made for the campaign.

17. The system of claim 7, wherein:
the auction experiment encompasses a plurality of budget-split or quota-split partitions;
a first partition of the plurality of budget-split or quota-split partitions is assigned to a control arm of the auction experiment;
a second partition of the plurality of budget-split or quota-split partitions is assigned to a treatment arm of the auction experiment;

during the auction experiment, one or more content requests assigned to the control arm of the auction experiment consume a first portion, of a budget of the over-delivered campaign, allocated to the first partition and do not consume any of the budget of the over-delivered campaign not allocated to the first partition; and during the auction experiment, one or more content requests assigned to the treatment arm of the auction experiment consume a second portion, of the budget of the over-delivered campaign, allocated to the second partition and do not consume any of the budget of the over-delivered campaign not allocated to the second partition.

18. The system of claim 7, wherein:

the auction experiment encompasses a bid treatment; and the bid treatment affects what campaigns bid in content request auctions.

19. The system of claim 7, wherein:

the auction experiment encompasses a throttling treatment; and the throttling treatment affects which campaigns are called to bid in content request auctions.

20. One or more non-transitory computer-readable media comprising:

instructions which, when executed by one or more computing devices of a computing system, cause the computing system to perform:

receiving a set of campaign data for content item campaign deliveries made during an auction experiment having a budget-split design or a quota-split design, the set of campaign data containing content from multiple campaigns, including previous campaigns, based on a specified delivery interval where the content was eligible for delivery;

based on the set of campaign data, identifying a campaign that was over-delivered during the auction experiment;

comparing a pass-through rate for the campaign to a pass-through rate threshold for the campaign; and based on the pass-through rate for the campaign being below the pass-through rate threshold for the campaign, removing the campaign from the auction experiment.

* * * * *